US008453212B2

(12) United States Patent
Feliciano Andrews et al.

(10) Patent No.: US 8,453,212 B2
(45) Date of Patent: May 28, 2013

(54) ACCESSING RESOURCES OF A SECURE COMPUTING NETWORK

(75) Inventors: Maria Antonio Feliciano Andrews, Spring Hill, FL (US); Sylvia A. Traxler, Seminole, FL (US); Luisito D. Espiritu, Clearwater, FL (US); Robert B. Batie, Lutz, FL (US); Alen Cruz, Tampa, FL (US); Stephan Gonzalez, Clearwater, FL (US)

(73) Assignee: Raytheon Company, Waltham, MA (US)

( * ) Notice: Subject to any disclaimer, the term of this patent is extended or adjusted under 35 U.S.C. 154(b) by 280 days.

(21) Appl. No.: 12/844,084

(22) Filed: Jul. 27, 2010

(65) Prior Publication Data

US 2012/0030733 A1    Feb. 2, 2012

(51) Int. Cl.
*G06F 7/04*   (2006.01)
(52) U.S. Cl.
USPC .................................. 726/4; 726/1; 715/706
(58) Field of Classification Search
None
See application file for complete search history.

(56) References Cited

U.S. PATENT DOCUMENTS

| 5,983,003 | A | 11/1999 | Lection et al. |
|---|---|---|---|
| 7,194,764 | B2 | 3/2007 | Martherus et al. |
| 7,474,318 | B2 | 1/2009 | Zhou et al. |
| 7,480,727 | B2 | 1/2009 | Domschitz |
| 7,480,934 | B2 | 1/2009 | Chan et al. |
| 7,493,558 | B2 | 2/2009 | Leahy et al. |
| 7,512,874 | B2 | 3/2009 | Yano et al. |
| 7,962,549 | B2 * | 6/2011 | Dhupelia et al. ............... 709/203 |
| 8,000,328 | B1 * | 8/2011 | Kandekar et al. ............. 370/392 |
| 2003/0084165 | A1 | 5/2003 | Kjellberg et al. |
| 2004/0059924 | A1 | 3/2004 | Soto et al. |
| 2004/0128390 | A1 | 7/2004 | Blakley et al. |
| 2005/0125674 | A1 * | 6/2005 | Nishiki et al. ................ 713/182 |
| 2007/0047819 | A1 | 3/2007 | Hull et al. |
| 2007/0101418 | A1 | 5/2007 | Wood et al. |

(Continued)

FOREIGN PATENT DOCUMENTS

| WO | WO 2005/096117 | 10/2005 |
|---|---|---|
| WO | WO 2008/049457 | 5/2008 |

OTHER PUBLICATIONS

Patent Cooperation Treaty, Notification of Transmittal of the International Search Report and the Written Opinion of the International Searching Authority, or the Declaration, International Application No. PCT/US2009/063785, Mailed Mar. 4, 2010, (13 pgs).

*Primary Examiner* — Jeffrey Pwu
*Assistant Examiner* — Carlos Amorin
(74) *Attorney, Agent, or Firm* — Schwegman Lundberg & Woessner, P.A.

(57) ABSTRACT

According to one embodiment of the present invention, a method for accessing resources of a secure computing network may be provided. The method may include receiving a request to allow a user to access a secure computing network. The user may be associated with an avatar that has a unique set of one or more identifiers that are associated with the user. A security clearance level of the avatar may be determined from the unique set of identifiers of the avatar. The avatar may be authorized to access one or more virtual compartments of the secure computing network according to the security clearance level of the avatar. The virtual compartment may comprise one or more resources of the secure computing network. The method may further include facilitating display of one or more resources of a virtual compartment accessed by the avatar.

12 Claims, 3 Drawing Sheets

U.S. PATENT DOCUMENTS

| | | |
|---|---|---|
| 2008/0066181 A1 | 3/2008 | Haveson et al. |
| 2008/0141367 A1* | 6/2008 | Ganz et al. ............ 726/21 |
| 2008/0175449 A1 | 7/2008 | Fang et al. |
| 2009/0080635 A1 | 3/2009 | Altberg et al. |
| 2009/0254842 A1* | 10/2009 | Leacock et al. ............ 715/757 |
| 2009/0265755 A1* | 10/2009 | Hamilton et al. ............ 726/1 |
| 2010/0050237 A1* | 2/2010 | Bokor et al. ............ 726/4 |
| 2010/0146608 A1 | 6/2010 | Batie et al. |
| 2010/0235202 A1* | 9/2010 | Strelling et al. ............ 705/7 |
| 2010/0332997 A1* | 12/2010 | Hamilton et al. ............ 715/757 |
| 2011/0022208 A1* | 1/2011 | Bouffiou et al. ............ 700/98 |
| 2011/0055712 A1* | 3/2011 | Tung et al. ............ 715/738 |
| 2011/0055919 A1* | 3/2011 | Hamilton et al. ............ 726/21 |
| 2011/0209195 A1* | 8/2011 | Kennedy ............ 726/1 |
| 2011/0209198 A1* | 8/2011 | Blattner et al. ............ 726/3 |
| 2011/0239117 A1* | 9/2011 | Sutton et al. ............ 715/706 |
| 2011/0265188 A1* | 10/2011 | Ramaswamy et al. ............ 726/28 |
| 2011/0302509 A1* | 12/2011 | Leacock et al. ............ 715/756 |
| 2012/0069131 A1* | 3/2012 | Abelow ............ 348/14.01 |
| 2012/0084353 A1* | 4/2012 | Herde et al. ............ 709/203 |
| 2012/0101871 A1* | 4/2012 | Lieberman ............ 705/7.29 |
| 2012/0179672 A1* | 7/2012 | Van Wie et al. ............ 707/723 |
| 2012/0207290 A1* | 8/2012 | Moyers et al. ............ 379/90.01 |
| 2012/0246582 A1* | 9/2012 | Leacock et al. ............ 715/753 |

* cited by examiner

ACCESSING RESOURCES OF A SECURE COMPUTING NETWORK

TECHNICAL FIELD

This invention relates generally to the field of network computing and more specifically to accessing resources of a secure computing network.

BACKGROUND

A secure computing network may comprise various resources provided by one or more computing systems. One or more security levels may be associated with the resources of the secure computing network. A user may access a particular resource of the secure computing network if the user has clearance to access the security level associated with the resource.

SUMMARY OF THE DISCLOSURE

In accordance with the present invention, disadvantages and problems associated with previous techniques for accessing resources of a secure computing network may be reduced or eliminated.

According to one embodiment of the present invention, a method for accessing resources of a secure computing network may be provided. The method may include receiving a request to allow a user to access a secure computing network. The user may be associated with an avatar that has a unique set of one or more identifiers that are associated with the user. A security clearance level of the avatar may be determined from the unique set of identifiers of the avatar. The avatar may be authorized to access one or more virtual compartments of the secure computing network according to the security clearance level of the avatar. The virtual compartment may comprise one or more resources of the secure computing network. The method may further include facilitating display of one or more resources of a virtual compartment accessed by the avatar.

Certain embodiments of the invention may provide one or more technical advantages. A technical advantage of one embodiment may be that a user may use an ergonomic approach to access resources of a secure computing network. Another technical advantage of one embodiment may be that access to resources of a secure computing network may be controlled according to an avatar profile. Another technical advantage of one embodiment may be that virtual compartments of a secure computing network may be displayed to a user.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
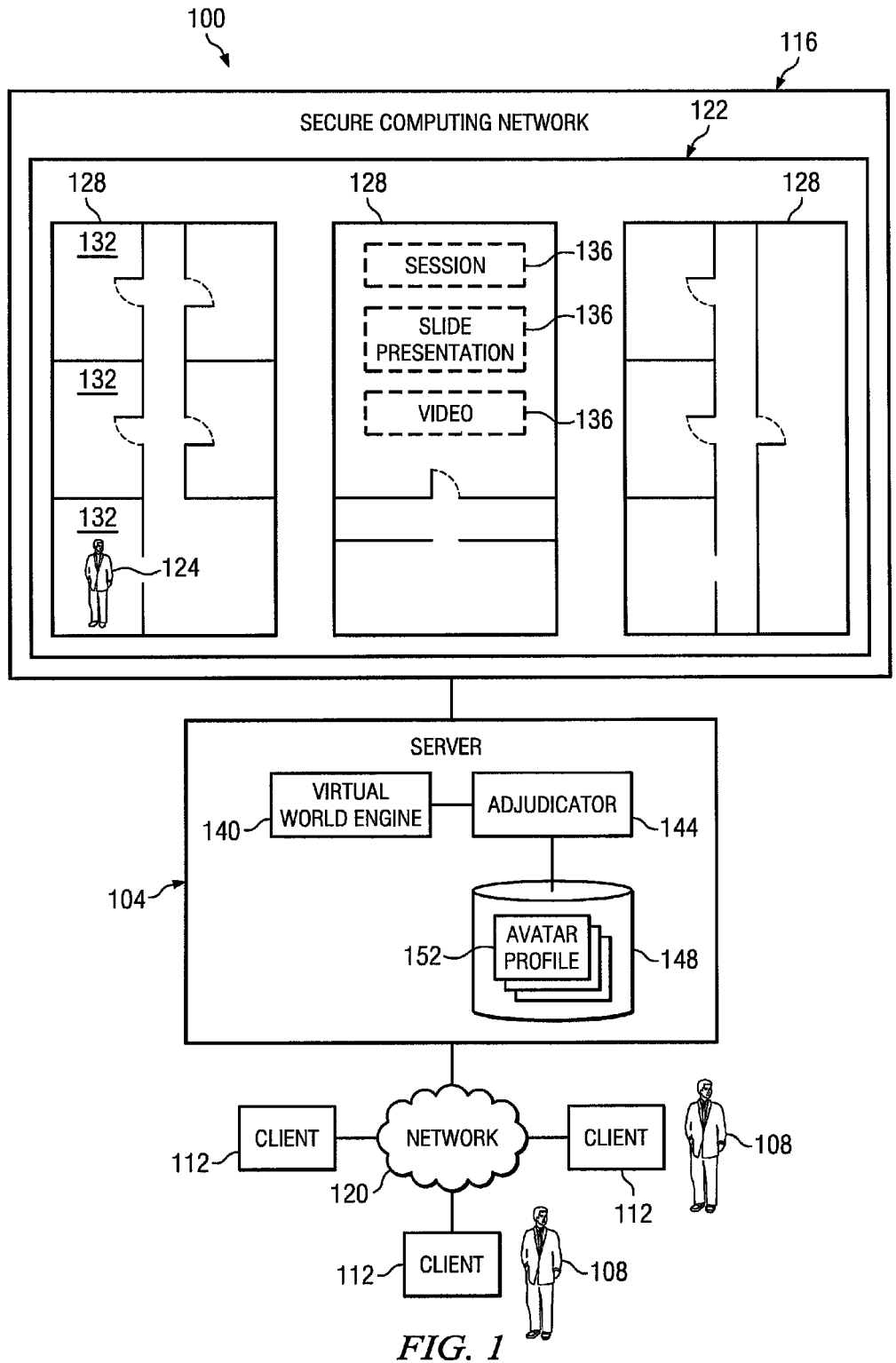
FIG. 1 depicts a system for accessing resources of a secure computing network.
Figure 2:
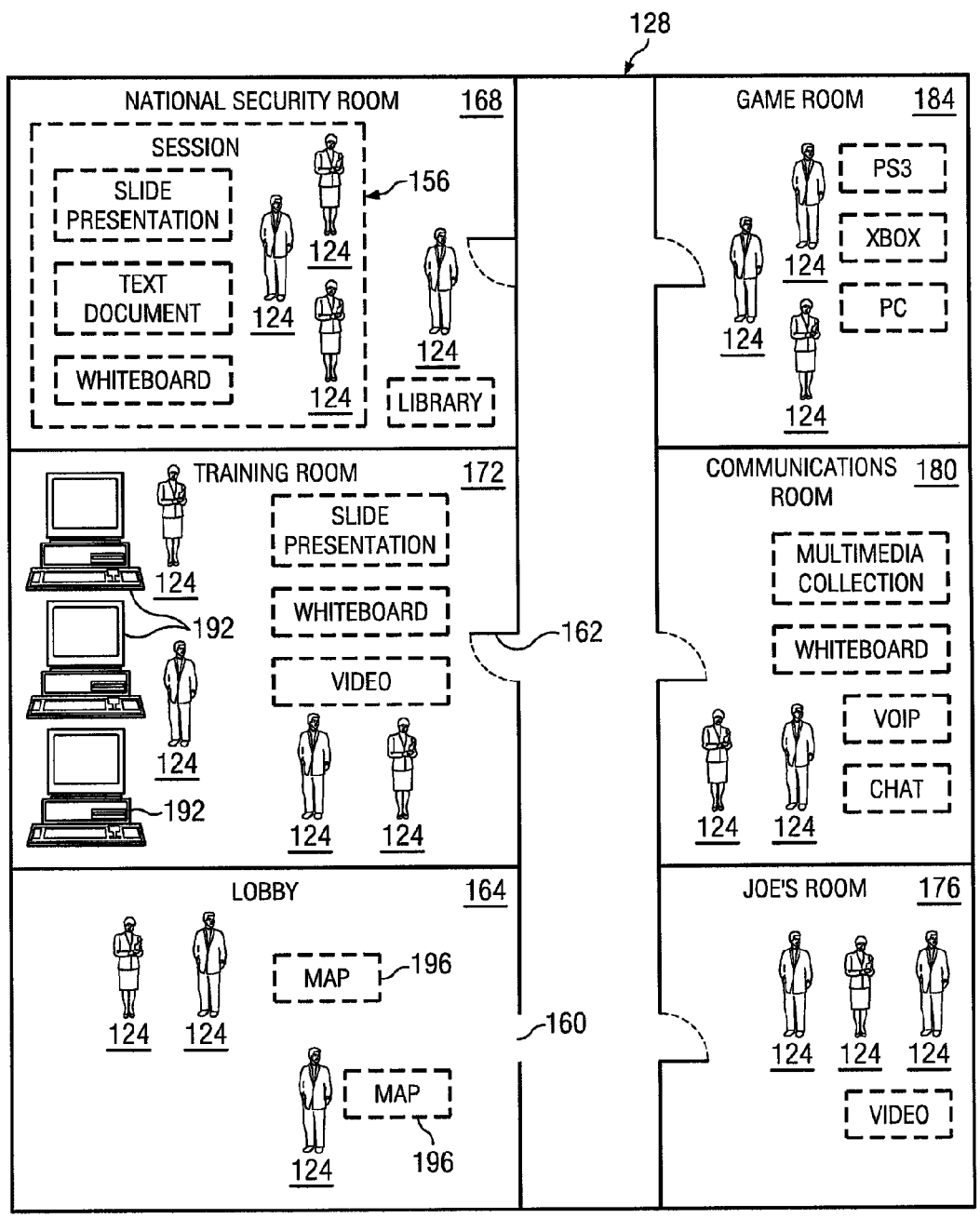
FIG. 2 depicts an example of a virtual building of a virtual world environment of the secure computing network.
Figure 3:
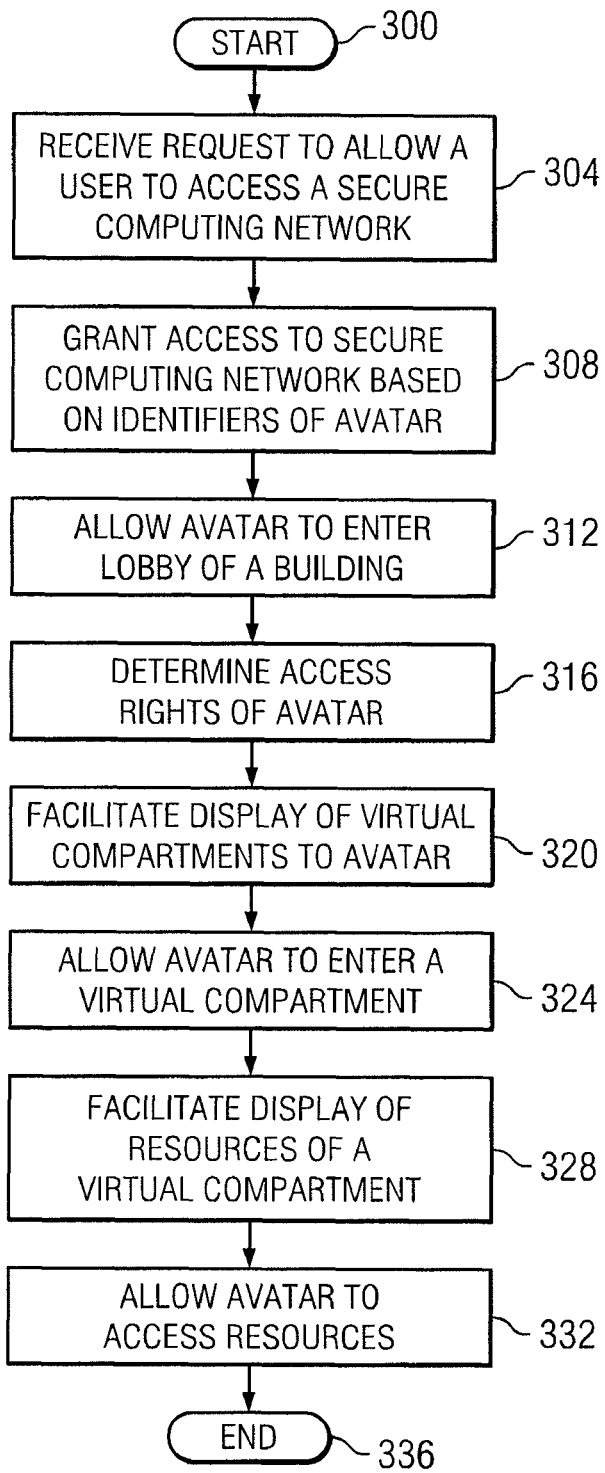
FIG. 3 depicts an example of a method for accessing resources of the secure computing network that may be performed by a server of the system.

Embodiments of the present invention and its advantages are best understood by referring to FIGS. 1-3 of the drawings, like numerals being used for like and corresponding parts of the various drawings.

FIG. 1 depicts a system 100 for accessing resources of a secure computing network 116. In some embodiments, the system 100 may be operable to receive a request to allow a user 108 to access a secure computing network 116. The user 108 may be associated with an avatar 124 that has a unique set of one or more identifiers that are associated with the user 108. The system 100 may determine a security clearance level of the avatar 124 from the unique set of identifiers of the avatar 124. The system 100 may authorize the avatar 124 to access one or more virtual compartments 132 of the secure computing network 116 according to the security clearance level of the avatar 124. A virtual compartment 132 may comprise one or more resources 136 of the secure computing network 116. The system 100 may facilitate display of one or more resources 136 of a virtual compartment 132 accessed by the avatar 124.

In the embodiment depicted, system 100 includes a secure computing network 116, a server 104, a network 120, and clients 112 coupled as shown. Client 112 may be a device capable of allowing a user 108 to communicate with server 104 through network 120. Client 112 may be any suitable device, such as a computing system. Network 120 may comprise any wireless and/or wired network that enables communication between clients 112 and server 104. User 108 may be any suitable entity or information that identifies an entity, such as a human, an organization, a user identifier, a profile, and/or other information.

Secure computing network 116 may include one or more computing systems that provide resources (such as information and services) to a plurality of users 108. In some embodiments, secure computing network 116 may comprise a plurality of computing systems (such as servers) and/or storage devices networked together. In various embodiments, secure computing network 116 may facilitate the sharing of information among multiple communities of interest. A community of interest may be any organization or domain that collaborates with others over a common network infrastructure. For example, communities of interest may include the United States Department of Defense, its related vendors, and/or other organizations. When linked together through server 104, users 108 from the various participating communities of interest may share their information with one another in a relatively efficient manner. The resources of secure computing network 116 may be protected according to a security scheme.

In some embodiments, a multi-level security (MLS) system may protect the resources of secure computing network 116. In some embodiments, all or a portion of the MLS system may reside at secure computing network 116, server 104, network 120, and/or client 112. For example, one or more operating systems of the secure computing network 116 may implement MLS. An MLS system may incorporate a multi-tiered security scheme in which a user 108 has access to resources of the system based upon one or more security clearance levels of the user. For example, in some embodiments, one or more resources of an MLS system may have a particular security level. In some embodiments, these resources may not be accessed by a user 108 unless the user has a security clearance level that authorizes access to resources of the particular security level. An MLS system facilitates protection of information of various levels of sensitivity. Thus, MLS systems may be advantageous in various organizations and/or industries, such as government, insurance, banking, and others.

A security level may be any suitable identifier that specifies one or more access rights to information (such as a resource 136 or virtual compartment 132). A security clearance level may be any suitable identifier of a user 108 or resource that specifies the access rights of the user or resource. In some embodiments, a security level and a security clearance level may have equivalent designations.

For example, a government or other suitable entity may use a MLS scheme that includes security levels (and security clearance levels) of top secret, secret, confidential, unclassified, and/or other security levels. In addition, some classified information may be sensitive enough to warrant the application of one or more additional security levels. These additional security levels may include, for example, sensitive compartmented information (SCI) or special access programs (SAP). Thus, in some embodiments, a resource may have a plurality of security levels, such as top secret and SAP.

In some embodiments, a security level may be indicated by a hex code or other suitable designation. For example, hex code "xFF" may indicate a highest level of security, such as top secret, and hex code "x00" may indicate a lowest level of security, such as unclassified. In some embodiments, intermediate levels of security may be indicated by hex codes such as "x0F," "x1A," or "xF1." In some embodiments, the security level indicator may be associated with the resource. For example, a hex code indicating a security level may be included in a header of a data file or program file.

In some embodiments, one or more users 108 and/or resources 136 may attempt to access a particular virtual compartment 132 and/or resource 136 of secure computing network 116. Access to a virtual compartment or resource may be controlled in any suitable manner. For example, in some embodiments, a user 108 or resource 136 that has a particular security clearance level may be authorized to access virtual compartments or resources of an equivalent security level. In some embodiments, access may be hierarchical, such that users 108 and/or resources 136 of a particular security clearance level may access virtual compartments and resources of equal or lower security levels, but may not access virtual compartments or resources of higher security levels. For example, a user 108 of security clearance level "x0F" may access a file of security level "x0F" or "x00," but may not access a file of security level "xFF." In other embodiments, users 108 and/or resources 136 of a particular security clearance level may be blocked from accessing virtual compartments or resources of a different security level. For example, a user 108 of security clearance level "x0F" may be blocked from accessing files of security levels "x00" and "xFF."

In some embodiments, a virtual compartment 132 and/or a resource 136 may have one or more exceptions that control access. An exception may be used instead of or along with a security level to determine whether that resource or virtual compartment may be accessed by a particular user 108 or resource. In some embodiments, an exception may allow a user 108 or resource 136 to access a particular virtual compartment 132 or resource 136 of a security level for which the user 108 or resource does not have security clearance. For example, an exception for an executable program with a security level of top secret may allow the program to be accessed by a particular user 108, even though the user only has a security clearance level of secret. In some embodiments, an exception may deny access to a virtual compartment 132 or resource 136 of a particular security level even if the user 108 or resource seeking to access the virtual compartment or resource has security clearance for that level. For example, a user 108 may be on a list of users that are not allowed to access a particular resource 136. As another example, information with a security level of top secret may have an exception that makes it available only on a "need-to know" basis. Thus, even if a user 108 has a security clearance level of top secret, the user 108 may not be able to access the information unless the user also qualifies under the "need-to know" exception. Exceptions may be persistent or temporary. For example, an exception may expire after a predetermined amount of time.

In some embodiments, an exception may be associated with the relevant virtual compartment 132 or resource 136. For example, an exception specifying that avatars Jack and Jill have access to a file (regardless of their security clearance level) may be stored in a header of the file. In some embodiments, an exception may be stored in one or more avatar profiles 152. For example, the avatar profiles 152 of Jack and Jill may each store an exception indicating that their respective avatar 124 may access the file.

In some embodiments, a resource 136 may be accessed by various methods. Each method of access may describe a particular action that may be performed in connection with the resource 136. For example, access methods may include "view," "read," "write," "share," "general," and/or other suitable access methods. In some embodiments, view access to a resource may allow a user 108 (or other resource) to ascertain the existence of the resource. For example, if a user 108 performs a search for a file of a particular name, the results may include the file only if the file exists and the user 108 has clearance to view the file. If the file exists but the user 108 does not have view access to the file, the file may not appear in the search results. In some embodiments, read access to a resource allows the user 108 (or other resource) to open, view the contents of, and/or use the resource. In some embodiments, write access to a resource allows the user 108 (or other resource) to save changes to the resource. In some embodiments, share access to a resource allows a user (or other resource) to share the resource with other users 108 or resources. In some embodiments, general access to a file may allow a user 108 (or other resource) to perform any of these actions (i.e., general access grants view, read, write, and share access rights).

In some embodiments, an access method may have one or more associated security levels. For example, read access for a particular file may be associated with "secret" and write access may be associated with "top secret." In this example, a user 108 that only has a security clearance level of "secret" may read from the file, but may not write to it. In some embodiments, a security level associated with general access to a resource may govern each method of access of the resource. In some embodiments, a security level may be assigned to any combination of access rights.

In some embodiments, a user 108 may create and/or own a resource 136. A creator and/or owner of a resource may be able to edit (e.g., establish or update) one or more security levels and/or exceptions of the resource. In some embodiments, an owner of a resource may designate the resource for collaboration (e.g., the owner may grant write access to other users). In some embodiments, the owner may make final edits and/or close the resource to editing. For example, after an owner finalizes a resource, a versioning meta tag associated with the resource may indicate that the resource is a final version and/or prevent others from editing the resource.

In some embodiments, system 100 may override or supplement security levels and/or exceptions assigned to a resource 136 (or virtual compartment 132) by a user 108. For example, a user 108 may assign a particular security level to a document. System 100 may analyze the contents of the document and increase the security level of the document if it determines that a higher security level is required.

In the embodiment depicted, secure computing network 116 is organized as a virtual world environment 122. A virtual world environment is a simulated real-world environment that may facilitate access to various resources of a system. Historically, virtual world environments included imaginary characters participating in fictional events and activities. Although conventional virtual world environments may provide ergonomic benefits, they generally do not provide sufficient security for use with secure computing systems that share information in a compartmented fashion, such as those using a multi-level security scheme. In some embodiments, system 100 may comprise security features that facilitate the use of a virtual world environment 122 with secure computing network 116.

In the embodiment depicted, virtual world environment 122 of secure computing network 116 includes three virtual buildings 128. Each virtual building may include one or more virtual compartments 132. A virtual compartment may include one or more resources 136.

A resource 136 may be any information or service provided or facilitated by the secure computing network 116. In some embodiments, a resource may be a file, a collection of files (such as a library), an executable program, a process, a session (described in connection with FIG. 2), or other suitable information or service. For example, a resource may be a whiteboard that avatars 124 may use to collaborate, a slide presentation, a video, a picture, a chat session, a phone call, a library, or other suitable information or service. In some embodiments, a resource may be accessed by a user 108 through an avatar 124 associated with the user. In some embodiments, user 108 may initiate a login session with server 104.

In the embodiment depicted, server 104 comprises virtual world engine 140, adjudicator 144, and storage device 148. Virtual world engine 140 may implement the virtual world environment 122 of secure computing network 116, thus providing an ergonomic approach to accessing resources of secure computing network 116. Virtual world engine 140 may manage the actions of a user 108 within the virtual world environment 122 through the use of an identity token, such as an avatar 124.

In some embodiments virtual world engine 140 may facilitate display of the virtual compartments 132 as rooms of a virtual building 124. In this document, "virtual compartment" and "room" may be used interchangeably. In some embodiments, as an avatar 124 moves from one virtual compartment 132 to another, the virtual world engine 140 may display graphics that depict the avatar 124 moving from one room to another. In some embodiments, the virtual world engine 140 may facilitate display of one or more resources 136 of a virtual compartment 132. For example, an avatar 124 that enters a room with a slide presentation may see the presentation as an icon or other graphic.

Any suitable type of virtual world engine 140 may be used. In some embodiments, virtual world engine 140 may be implemented on a PROJECT WONDERLAND platform that is executed with a PROJECT DARKSTAR engine developed by SUN MICROSYSTEMS, located in Santa Clara, Calif. In some embodiments, the PROJECT WONDERLAND platform may allow various elements of secure computing network 116 to be virtually modeled in a virtual world environment 122.

In some embodiments, each avatar 124 may have an avatar profile 152 stored in storage device 148. An avatar profile may be associated with a user 108, that is, the avatar profile 152 may include various information about the user, such as one or more identifiers of the user 108, user profile information, and/or one or more security clearance levels of the user 108.

In some embodiments, a user 108 may be required to participate in a login session when the user attempts to access secure computing network 116. During the login session, the avatar profile 152 of the user 108 may be identified and the user may receive access to the secure computing network 116 according to data contained in the user's avatar profile 152.

In some embodiments, an avatar profile 152 may include a unique set of identifiers of the avatar 124 associated with user 108. The identifiers may be associated with the corresponding user and may comprise any information that allows server 104 to identify user 108, such as a user name, a password, an address (e.g., Internet Protocol or Media Access Control), user profile information (e.g., date of birth, social security number, mother's maiden name), a biometric signature, a graphics file representing the biometric signature, other information, and/or a combination of the preceding. In some embodiments, a biometric signature may include retina, fingerprint, palm, facial, or other biometric information of user 108 that facilitates identification of the user. In some embodiments, the one or more identifiers may be used to verify that a user 108 is initiating a login session with the user's own avatar 124 (i.e., to ensure that the user's identity has not been compromised).

Storage device 148 may include any memory and/or database module including volatile and/or non-volatile memory. For example, storage device 148 may comprise magnetic media, optical media, random access memory (RAM), read-only memory (ROM), removable media, and/or any other suitable local or remote memory component.

Adjudicator 144 may interact with storage device 148 and virtual world engine 140 to provide various security features. In some embodiments, adjudicator 144 may determine one or more security clearance levels of the avatar 124 from the unique set of identifiers of the avatar. In some embodiments, server 104 may receive a request to allow a user 108 to access secure computing network 116. After the request is received, adjudicator 144 may access storage device 148 and compare the identifiers submitted by a user 108 with identifiers associated with one or more of the avatar profiles 152. The adjudicator 144 may determine that the user 108 corresponds to a particular avatar profile 152.

In some embodiments, adjudicator 144 may act in conjunction with virtual world engine 140 to facilitate display of the graphics that user 108 is allowed to view. In some embodiments, the adjudicator 144 may prevent virtual world engine 140 from displaying unauthorized graphics. For example, if an avatar 124 does not have security clearance to view a particular virtual compartment 132, the adjudicator 144 may facilitate blocking of the virtual compartment 132 so that it is not shown to the user 108. As another example, if an avatar 124 does not have sufficient security clearance to view a particular resource 136, the adjudicator 144 may ensure that that resource is not shown to user 108, even if avatar 124 of user 108 enters a virtual compartment 132 that includes the resource. In some embodiments, adjudicator 144 may access the avatar profile 152 of the user to determine one or more security clearance levels and/or exceptions of the avatar 124.

Adjudicator 144 may then regulate display of graphics according to these levels and exceptions.

FIG. 2 depicts an example of a virtual building 128 of a virtual world environment 122 of secure computing network 116. As described above, when a user 108 attempts to access secure computing network 116, adjudicator 144 may compare the received identifiers with information stored in the avatar profiles 152. If a proper match is not made, the user 108 may be denied access to secure computing network 116. If a proper match is made, a login session may be initiated and a virtual world environment that includes avatar 124 may be displayed to user 108 (e.g., by client 112).

In some embodiments, after a login session is initiated, an avatar 124 may be placed in a lobby 164 of a default virtual building 128. In other embodiments, the avatar 124 may select the virtual building 128 from a list of virtual buildings. In some embodiments, the system 100 may restrict avatar 124 to the lobby until the system determines which virtual compartments 168-184 of virtual building 128 may be accessed by avatar 124.

In various embodiments, system 100 may authorize the avatar 124 to view and/or enter one or more virtual compartments 132 of the secure computing network 116 according to one or more security clearance levels and/or exceptions of the avatar 124. For example, during login and/or while the avatar 124 is in the lobby, the system 100 may determine the virtual compartments 168-184 that may be viewed and/or entered by avatar 124 and present a map 196 of the virtual building 128 to the avatar 124. The map of the virtual building may include each virtual compartment 132 that the avatar is authorized to view. In some embodiments, the map may also indicate whether the avatar 124 is authorized to enter one or more of the virtual compartments. If an avatar 124 does not have view access to a room, the room will not appear on the map (nor will it be viewable as avatar 124 navigates the virtual building 128). For example, an avatar 124 may have clearance to view the game room 184 and communications room 180, but not the national security room 168. Thus, the national security room will not appear on the map of the user and the existence of the room may be kept from user 108. In some embodiments, a map for a particular avatar 124 may not be viewable by other avatars 124.

In the illustrated example, doorway 160 has no closeable door indicating that movement to the lobby 164 may be possible by a user's avatar 124 regardless of the avatar's security clearance level. Conversely, doorways 162 are closeable, indicating that a certain security clearance level may be required for the user's avatar 124 to enter the corresponding rooms.

In some embodiments, the avatar 124 may access one or more virtual compartments 164-184 of the virtual building 128 by entering the corresponding room. Upon entering a room, an avatar 124 may see one or more resources 136 of the room if the avatar has view access to these resources. If the avatar 124 has other access rights to a resource, the avatar may access the resource 136 accordingly. If a resource 136 has a higher security level (for view access or general access) than the security clearance level of the avatar 124, then the system 100 may prevent the display of the resource to the avatar. Thus, a user 108 may be able to access a virtual compartment 132 without being able to view all the resources 136 of the virtual compartment.

Various examples of virtual compartments 164-184 will now be explained. In the embodiment depicted, virtual building 128 includes national security room 168. National security room may have a security level associated with it. For example, the security level of the national security room 168 may be top secret. Avatars 124 may enter the national security room if they have top secret clearance or have been granted an exception. National security room may comprise various resources 136, such as a library and a session 156 (which may also include resources).

Session 156 may be a venue for the sharing of information among avatars 124. In some embodiments, a session 156 may have security requirements beyond those required to enter the room that hosts the session 156. For example, session 156 could require that an avatar 124 have "need-to know" security clearance before entering the session or that the avatar be part of a group of pre-identified avatars. A session may include various resources, such as a whiteboard for collaborating, a text document, or a slide presentation.

In some embodiments, system 100 may identify information that is relevant to a session 156. For example, in some embodiments, system 100 may monitor one or more sources of information, such as a Really Simple Syndication (RSS) feed. If the system 100 determines that the content of the information is relevant to the session 156, it may distribute the information to the session, that is, it may make the information available to the avatars 124 participating in the session. The system 100 may determine that the information is relevant to the session 156 in any suitable manner, such as through comparison of key words of session 156 with the monitored information. In some embodiments, an avatar 124 may be authorized to view this information as long as the avatar has sufficient security clearance for the session 156. In other embodiments, the information may have additional security requirements beyond what the session 156 and/or room 132 requires. If an avatar 124 has security clearance that meets these additional requirements, it will be allowed to access the information.

In the embodiment depicted, virtual building 128 includes a training room 172. Training room 172 may comprise various resources such as a whiteboard for collaborating, a training video, a slide presentation, and virtual machines 192. After entering the training room 172, an avatar may access a virtual machine 192. The virtual machine may allow access to one or more computing devices (e.g., servers) that facilitate the provision of training materials. In some embodiments, an avatar 124 in close proximity with a virtual machine 192 may represent that the virtual machine is in use. Once an avatar 124 is done using the virtual machine 192, it may move away from the machine to signal to another avatar that the virtual machine is no longer in use.

In some embodiments, an avatar 124 may be authorized to generate its own virtual compartment 132 (such as Joe's room 176) of secure computing network 116. This virtual compartment 132 may be assigned a security level by any suitable entity, such as system 100 or avatar 124. In some embodiments, the avatar 124 may add and/or remove resources from the virtual compartment 132. In some embodiments, system 100 may prevent an avatar 124 from placing a resource 136 in a virtual compartment 132 if the resource has a higher security level than the virtual compartment.

In the embodiment depicted, virtual building 128 includes a communications room 180. The communications room 180 may include any suitable communication resources, such as a whiteboard for collaborating, a multimedia collection, a chat session, and a Voice over Internet Protocol (VoIP) session. An avatar 124 may use the communication resources to communicate with another avatar or a person that has not logged in to the secure computing network (a "visitor"), such as a friend or family member.

In some embodiments, communications room 180 may provide communication resources that are more secure than conventional communication resources such as a telephone, instant messaging service, FACEBOOK, or MYSPACE. For example, the system 100 may apply various security features to the multimedia collection. For example, in some embodiments, the elements of the multimedia collection, such as pictures or videos, may be preapproved before they can be shared. In some embodiments, the elements of the multimedia collection may be viewed by others, but not downloaded. In some embodiments, communication (such as voice or text) may be monitored to prevent disclosure of secure information.

In the embodiment depicted, virtual building 128 may include game room 184. The game room 184 may allow an avatar 124 to participate in a game with another avatar or a visitor. In some embodiments, various gaming interfaces (such as SONY PLAYSTATION, MICROSOFT XBOX, NINTENDO WII, or personal computer) may be used.

In some embodiments, an avatar 124 may communicate with another avatar that occupies the same room 132. In various embodiments, this communication may be monitored. In some embodiments, the communication may be disabled if it references information that the avatar 124 is unauthorized to access. For example, while an avatar 124 is in the lobby 132, it may query another avatar as to the contents of the virtual building 128 (such as rooms and/or resources). If the query is impermissible (e.g., the avatar 124 may lack view access for every virtual compartment 132 of the virtual building 128), the system 100 may take disciplinary action, such as disabling communication of the avatar 124, logging the avatar off of the secure computing network 116, blocking the avatar from accessing the secure computing network and/or resources of the secure computing network, interrogating the avatar, and/or other suitable action.

In some embodiments, a user 108 may be prevented from accessing the secure computing network 116 unless an avatar 124 associated with the user is displayed in a virtual building 128. This feature may facilitate security by preventing anonymous access to resources 136. This feature may also facilitate security by allowing avatars 124 to monitor each other. For example, an avatar 124 that frequents a room (such as the national security room 168) may be familiar with the other avatars that are authorized to enter that room. Thus, if an unauthorized avatar enters a room, the avatar 124 may report the intrusion and the system 100 may respond accordingly.

The ability of an avatar to view another avatar may be governed by any suitable scheme. For example, in some embodiments, any avatar 124 in a room 132 may be able to see any other avatar in the room. In other embodiments, one or more avatars may be invisible to a particular avatar. For example, in some embodiments, avatars of a particular security level may view avatars of a lower security level, but not vice versa. In some embodiments, a user 108 may choose whether the avatar associated with the user will be visible to avatars having lower security clearance levels. In some embodiments, an avatar may only be able to see avatars of an equivalent security level.

In some embodiments, an avatar 124 may be restricted to movement through virtual world environment 122 according to one or more security clearance levels of the avatar. In some embodiments, adjudicator 144 may periodically record the location of avatar 124 in a logfile. In this manner, adjudicator 144 may monitor users 108 of secure computing network 116 over a period of time to identify potentially malicious users who may attempt or otherwise obtain entry into unauthorized rooms 132.

In some embodiments, avatar 124 may include information associated with one or more roles of the associated user 108. For example, the one or more roles may include a data miner, a general participant, an administrator, a coordinator, an observer, a communication intelligence guard, or other suitable role. The one or more roles may be used by adjudicator 144 to track the location of avatar 124 for generation of auditable actions within secure computing network 116. For example, adjudicator 144 may track the location of avatar 124 over a period of time and compare the security level of information accessed by avatar 124 to the one or more roles of avatar 124. In this manner, adjudicator 144 may ascertain whether the user 108 associated with avatar 124 has been accessing information in secure computing network 116 that may be outside the scope of his or her one or more assigned roles.

In some embodiments, communication of avatar 124 may be recorded and/or monitored. In some embodiments, the time, duration, and/or method of access of a room 132 or resource 136 may be recorded and/or monitored. In some embodiments, any suspicious activity may be reported to adjudicator 144 and appropriate action taken.

In some embodiments, a security clearance level and/or an exception may be updated without requiring a new login session. For example, an avatar 124 may be granted an exception while the avatar is in lobby 164 or other room 132. The exception may be stored in avatar profile 152 and/or associated with the relevant resource 136 or room 132. Adjudicator 144 may use this information to allow access to the relevant resource or room without requiring a new login session by the user 108 associated with the avatar 124.

FIG. 3 depicts an example of a method for accessing resources of a secure computing network 116 that may be performed by a server 104. The method begins at step 300. At step 304, the server 104 receives a request to allow a user 108 to access a secure computing network 116. At step 308, the server 104 grants access to secure computing network 116 based on identifiers of an avatar 124 associated with the user 108. For example, the server 104 may compare identifiers included in the request from the user 108 with identifiers stored in an avatar profile 152 of the avatar. If the identifiers are sufficiently similar, access to secure computing network 116 may be granted.

After access to the secure computing network 116 is granted, at step 312, the server 104 allows avatar 124 to enter the lobby 164 of virtual building 128. At step 316, the server 104 may determine the access rights of the avatar 124. For example, the server 104 may access the avatar profile 152 to determine which virtual buildings 128 and/or resources 136 the avatar can view, read, write, and/or share. At step 320, the server 104 facilitates display of one or more virtual compartments 132 to avatar 124. For example, a map of the virtual compartments 132 of the virtual building 128 that the avatar 124 has access to may be displayed to the avatar. As another example, a virtual compartment 132 may be displayed as a room to avatar 124.

At step 324, the server 104 may allow the avatar 124 to enter a virtual compartment 132. For example, the user 108 may navigate the avatar 124 to a virtual compartment 132 that appears on a map. As another example, the system 100 may teleport the avatar 124 to a virtual compartment 132. At step 328, the server 104 may facilitate display of the resources 136 of the virtual compartment 132. For example, the resources 136 may appear as an icon or other graphic within a room 132. At step 332, the server may allow the avatar 124 to access one or more of the resources 136. For example, the server 104 may allow the avatar 124 to view, read, write, and/or share the resource if the avatar 124 has a security clearance level that is equal to or higher than the security level associated with these access methods. The process ends at step 336.

Modifications, additions, or omissions may be made to the systems and apparatuses disclosed herein without departing from the scope of the invention. The components of the systems and apparatuses may be integrated or separated. For example, the components of server 104 may reside on two or more devices. Moreover, the operations of the systems and apparatuses may be performed by more, fewer, or other components. For example, the operations of server 104 and client 112 may be performed by one component, or the operations of server 104 and/or client 112 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The method may include more, fewer, or other steps. Additionally, steps may be performed in any suitable order. For example, step 316 may be performed when an avatar 124 enters a virtual compartment 132 in order to determine the resources 136 that may be accessed by the avatar.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving a request to allow a user to access a secure computing network, the user associated with an avatar, the avatar having a unique set of one or more identifiers that are associated with the user, the unique set of one or more identifiers including biometric information of the user;
   determining a security clearance level of the avatar from the unique set of one or more identifiers of the avatar;
   authorizing the avatar to access one or more virtual compartments of the secure computing network according to the security clearance level of the avatar, a virtual compartment of the one or more virtual compartments comprising one or more resources of the secure computing network;
   displaying a virtual compartment of the one or more virtual compartments as a room of a virtual building that the avatar may enter when the avatar is authorized to access the virtual compartment;
   when the avatar accesses the virtual compartment, displaying the one or more resources of the virtual compartment;
   monitoring communication between the avatar and a second avatar;
   disabling the communication if the communication references information that the avatar is unauthorized to access;
   facilitating display of the avatar to one or more second avatars of a higher security clearance level; and
   preventing display of the one or more second avatars of the higher security clearance level to the avatar.

2. The method of claim 1, further comprising:
   preventing the user from accessing the secure computing network unless the avatar associated with the user is displayed in at least one virtual compartment of the one or more virtual compartments.

3. The method of claim 1, further comprising:
   authorizing the avatar to generate a second virtual compartment of the secure computing network; and
   assigning a security level to the second virtual compartment.

4. The method of claim 1, further comprising:
   facilitating a session of the virtual compartment, the session including the sharing of information among the avatar and one or more second avatars;
   identifying information that is relevant to the session; and
   allowing the avatar to access the information if the avatar is authorized to access the information.

5. One or more tangible non-transitory computer-readable media having computer-executable code, when executed by a computer operating to:
   receive a request to allow a user to access a secure computing network, the user associated with an avatar, the avatar having a unique set of one or more identifiers that are associated with the user, the unique set of one or more identifiers including biometric information of the user;
   determine a security clearance level of the avatar from the unique set of one or more identifiers of the avatar;
   authorize the avatar to access one or more virtual compartments of the secure computing network according to the security clearance level of the avatar, a virtual compartment of the one or more virtual compartments comprising one or more resources of the secure computing network;

display a virtual compartment of the one or more virtual compartments as a room of a virtual building that the avatar may enter when the avatar is authorized to access the virtual compartment;

when the avatar accesses the virtual compartment, displaying the one or more resources of the virtual compartment;

monitor communication between the avatar and a second avatar;

disable the communication if the communication references information that the avatar is unauthorized to access;

facilitate display of the avatar to one or more second avatars of a higher security clearance level; and prevent display of the one or more second avatars of the higher security clearance level to the avatar.

6. The media of claim 5, when executed by a computer further operating to:

prevent the user from accessing the secure computing network unless the avatar associated with the user is displayed in at least one virtual compartment of the one or more virtual compartments.

7. The media of claim 5, when executed by a computer further operating to:

authorize the avatar to generate a second virtual compartment of the secure computing network; and assign a security level to the second virtual compartment.

8. The media of claim 5, when executed by a computer further operating to:

facilitate a session of the virtual compartment, the session including the sharing of information among the avatar and one or more second avatars;

identify information that is relevant to the session; and allow the avatar to access the information if the avatar is authorized to access the information.

9. A system comprising:

one or more processors;

a memory that stores logic operating to:

receive a request to allow a user to access a secure computing network, the user associated with an avatar, the avatar having a unique set of one or more identifiers that are associated with the user, the unique set of one or more identifiers comprising biometric information of the user;

determine a security clearance level of the avatar from the unique set of one or more identifiers of the avatar;

authorize the avatar to access one or more virtual compartments of the secure computing network according to the security clearance level of the avatar, a virtual compartment of the one or more virtual compartments comprising one or more resources of the secure computing network;

display a virtual compartment of the one or more virtual compartments when the avatar is authorized to access the virtual compartment;

when the avatar accesses the virtual compartment, display the one or more resources of the virtual compartment as a room of a virtual building that the avatar may enter;

monitor communication between the avatar and a second avatar;

disable the communication if the communication references information that the avatar is unauthorized to access;

facilitate display of the avatar to one or more second avatars of a higher security clearance level; and prevent display of the one or more second avatars of the higher security clearance level to the avatar.

10. The system of claim 9, the logic further operating to:

prevent the user from accessing the secure computing network unless the avatar associated with the user is displayed in at least one virtual compartment of the one or more virtual compartments.

11. The system of claim 9, the logic further operating to:

authorize the avatar to generate a second virtual compartment of the secure computing network; and assign a security level to the second virtual compartment.

12. The system of claim 9, the logic further operating to:

facilitate a session of the virtual compartment, the session including the sharing of information among the avatar and one or more second avatars;

identify information that is relevant to the session; and allow the avatar to access the information if the avatar is authorized to access the information.

* * * * *